March 10, 1970 A. SCARFI ET AL 3,499,725
METHOD OF PROCESSING KAINITE ORES THROUGH INTERMEDIATE
FORMATION OF LANGBEINITE
Filed July 7, 1967
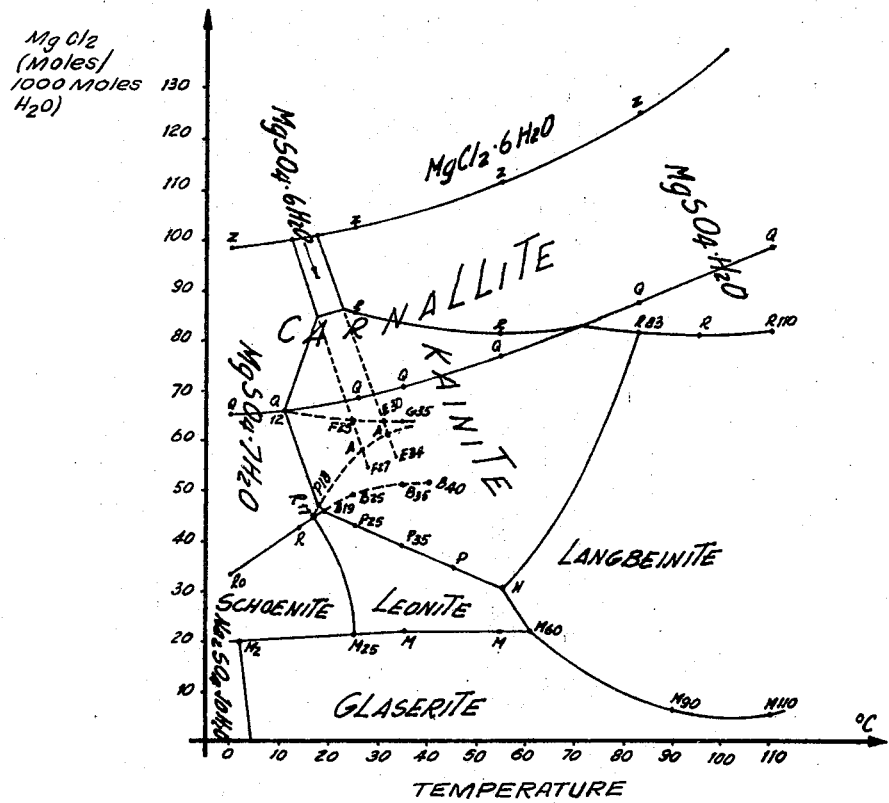
ALBERTO SCARFI
EMANUELE GUGLIOTTA
INVENTORS
BY
Karl F. Ross
Attorney United States Patent Office 3,499,725
Patented Mar. 10, 1970

3,499,725
METHOD OF PROCESSING KAINITE ORES THROUGH INTERMEDIATE FORMATION OF LANGBEINITE
Alberto Scarfi and Emanuele Gugliotta, Siracusa, Italy, assignors to SINCAT-Societa Industriale Catanese S.p.A., Milan, Italy, a corporation of Italy
Continuation-in-part of application Ser. No. 295,793, July 17, 1963. This application July 7, 1967, Ser. No. 651,823
The portion of the term of the patent subsequent to Dec. 10, 1985, has been disclaimed
Claims priority, application Italy, July 17, 1962, 14,395/62
Int. Cl. C01d 5/12, 3/08; C01f 5/40
U.S. Cl. 23—38                                13 Claims

ABSTRACT OF THE DISCLOSURE

A process for producing potassium chloride and at least one salt from the group of schoenite, leonite and magnesium sulfate hydrate wherein kainite is treated with a brine containing magnesium chloride at a temperature between 90° C. and 115° C. to produce a langbenite slurry, the slurry is cooled at a temperature between 40° C. and 20° C. to precipitate the desired potassium or magnesium salt from a final brine in equilibrium therewith, and the composition of the initial brine is adjusted for the production of potassium chloride and schoenite or leonite and for the production of potassium chloride and magnesium sulfate hydrate containing substantially 6 to 7 molecules of water per molecule of magnesium sulfate by either establishing the concentration of magnesium chloride in the final brine in equilibrium with the recovered salts at 43 to 52 moles per 1000 moles $H_2O$ and saturation by potassium chloride, by maintaining the initial brine composition at 5 to 40 moles of magnesium chloride and at least 2 moles $K_2Cl_2$ per 1000 moles $H_2O$, or by establishing the concentration of magnesium chloride in the final brine in equilibrium with the recovered salts at 52 to 65 moles per 1000 moles $H_2O$ and saturation by potassium chloride and magnesium sulfate, by maintaining an initial brine composition containing 10 to 50 moles magnesium chloride per 1000 moles $H_2O$.

This application is a continuation in part of application Ser. No. 295,793 filed on July 17, 1963, now abandoned.

This invention relates to a process for processing kainite for the production of potassium and magnesium salts.

The known processes of kainite treatment for the production of $K_2SO_4$ and/or KCl, e.g. the process based upon the transformation of kainite to schoenite, are hindered by the impossibility of attaining in practice the equilibrium foreseen by the theory of salt systems containing the six components: $K^+$, $Na^+$, $Mg^{++}$, $Cl^-$, $SO_4^-$ and $H_2O$ (see J. D'Ans: "Die Loesungsgleichgewichte der Systeme der Salze ozeanischer Salzablagerungen" Berlin, 1933). The equilibrium values reported by Autenrieth (Neue fuer die Kalirohsalze Verarbeitung . . . , Kali und Steinsalz, October 1955, Heft 11, pp. 18–32) refer to reaction times of at least 10–15 days.

Since the kainite decomposition rate tends to go to zero for $MgCl_2$ concentrations close to the equilibrium levels, the reaction in industrial practice proves to be never complete after periods of 3–5 hours which constitute the longest permissible treatment duration.

Applicants have now found that for kainite processing cycles wherein the $K_2SO_4$ and/or KCl production is desired the theoretical equilibria may be attained industrially when the kainite is previously transformed to langbeinite ($K_2SO_4 \cdot 2MgSO_4$) through the use of brines of suitable composition.

Moreover, the intermediaate formation of langbeinite allows also metastable equilibria to be rapidly attained; such equilibria are more profitable with respect to potassium yield by comparison with equilibria attainable by starting with a solid phase constituted of kainite. For instance, by starting with kainite, a maximum content of 43 moles $MgCl_2/1000$ moles water in the stable-equilibrium brine may be attained at 25° C. in the presence of KCl, NaCl, kainite and leonite as solid phases; however, by previously converting the kainite to langbeinite, a concentration of 63 moles $MgCl_2/1000$ moles water may be attained in the metastable-equilibrium brine at 25° C. in the presence of KCl, NaCl, $MgSo_4 \cdot 7H_2O$ and carnallite as solid phases. Since the potassium yield increases with the $MgCl_2$ concentration of the final equilibrium brines, it becomes evident that the present process allows higher potassium yields to be obtained.

The process according to this invention is carried out as follows:

In a first step the mineral kainite is treated with a brine containing $MgCl_2$ at temperatures between 90° and 110° C., thereby obtaining a langbeinite slurry.

In a second step the langbeinite slurry is cooled to temperatures between 40° and 20° C., thereby obtaining the desired potassium and magnesium salts, in the presence of a final brine in equilibrium with these salts.

The quantity and composition of the starting brine is chosen, according to the nature of the potassium and magnesium salts that are to be obtained, in such manner that:

(1) When KCl and schoenite or leonite are desired, the final equilibrium brine will have a $MgCl_2$ concentration between 43 and 52 moles per 1000 moles of $H_2O$ and the final brine will be saturated with KCl. In this case the starting brine must have a $MgCl_2$ concentration between 5 and 40 moles/1000 moles of $H_2O$ and a $K_2Cl_2$ concentration of at least 2 moles/1000 moles of $H_2O$.

(2) When KCl and hydrated $MgSO_4$ having from six to seven molecules of water for each mloecule of magnesium sulfate are to be obtained, the final equilibrium brine will have a $MgCl_2$ concentration between 52 and 65 moles/1000 moles of $H_2O$ and will be saturated with KCl and $MgSO_4$. In such a case the starting brine must have a $MgCl_2$ concentration between 10 and 50 moles/1000 moles of $H_2O$. When raw NaCl-impure kainite is processed, the resulting mixtures contain also NaCl.

Accordingly, this kainite-treatment method consists essentially in a hot-cold process wherein the transformation of kainite to schoenite or leonite and KCl or the transformation to KCl and $MgSO_4 \cdot 6H_2O$ or $MgSO_4 \cdot 7H_2O$ is achieved not directly, but through the intermediate formation of langbeinite, which is not separated as a self-existent solid phase during the process.

The process will now be described in greater detail with reference to the accompanying drawing, the sole figure of which is a phase diagram derived from a drawing of the above-mentioned article by Autenrieth (page 28, drawing No. 2).

In this figure, which relates to brines saturated with KCl, the temperatures are plotted along the abscissa while the ordinates indicate the concentration of $MgCl_2$ in the brine in equilibrium with the various solid phases, whose stability areas are indicated in the figure. More particularly, these stability areas correspond to the stable equilibria determined after reaction times of at least 10–15 days.

In certain temperature and $MgCl_2$ concentration areas, stable and metastable equilibria may co-exist which correspond to different salts or salt mixtures. Such is, for instance the case of the zone defined in the figure by the points $B_{40}$–$B_{35}$–$B_{25}$–$B_{19}$–$P_{25}$–$P_{35}$ which for the stable equilibrium corresponds to a solid phase constituted by kainite and for the metastable equilibrium to a solid phase constituted by KCl and schoenite.

The studies by D'Ans and Autenrieth do not give any indications as to the modalities to be followed in order to obtain a particular equilibrium rather than any other equilibrium capable of co-existing therewith, nor any indication with respect to the kinetics of the reactions, which, as is known, are often very slow.

Particularly interesting for the purposes of our illustration are the stability fields of langbeinite, defined in the figure by the lines $R_{110}$–$R_{83}$, $R_{83}$–N, N–$M_{60}$ and $M_{60}$–$M_{90}$–$M_{110}$; of schoenite and KCl defined by lines $R_0$–$R_{17}$, $R_{17}$–$M_{25}$ and $M_{25}$–$M_2$; of leonite and KCl defined by lines $M_{60}$–$M_{25}$, $M_{25}$–$R_{17}$, $R_{17}$–$B_{19}$, $B_{19}$–$P_{25}$–$P_{35}$–N and N–$M_{60}$; and the fields of metastability of KCl and schoenite defined by the lines $B_{40}$–$B_{35}$–$B_{25}$–$B_{19}$ and $B_{19}$–$P_{25}$–$P_{35}$; and of KCl and $MgSO_4 \cdot 7H_2O$ (defined by the lines $G_{35}$–$E_{30}$–$F_{25}$–$Q_{12}$, $Q_{12}$–$P_{18}$, $P_{18}$–$B_{19}$ and $B_{19}$–$B_{25}$–$B_{35}$–$B_{40}$).

Autenrieth has already stressed the existence of the curve $B_{19}$–$B_{25}$–$B_{35}$ up to 35° C. We have now ascertained that according to $B_{35}$–$B_{40}$ it extends up to 40° C.

Now, according to this invention, we have found that, while the known direct conversion of kainite into schoenite or leonite is slow and incomplete, the conversion, at the temperatures and at the concentrations specified, of the kainite into langbeinite and subsequently of langbeinite into mixtures of potassium and magnesium salts is fast and complete. Furthermore we have found that the presence of the sodium chloride coming from the raw mineral does not hinder either the course of the first reaction under heat, or the second reaction under cold.

As can be seen from the diagram, at temperatures comprised between 90° and 110° C., the kainite does not exist as a stable solid phase and we find ourselves in the field of stability of the langbeinite, provided the $MgCl_2$ content of the brine in equilibrium with the langbeinite is between the values corresponding to the curve $R_{83}$–$R_{110}$ for the maximum limit and the values corresponding to the curve N–$M_{60}$–$M_{90}$–$M_{110}$ for the minimum limit. The field of stability of the langbeinite extends beyond the maximum temperature (110° C.) contemplated in the diagram of Autenrieth, that is, up to the boiling temperature of the brines (about 115° C.) and even beyond, when working under pressure.

Since the conversion of the kainite into langbeinite:

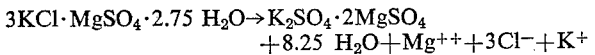

$$3KCl \cdot MgSO_4 \cdot 2.75\ H_2O \rightarrow K_2SO_4 \cdot 2MgSO_4 + 8.25\ H_2O + Mg^{++} + 3Cl^- + K^+$$

frees magnesium chloride which dissolves in the brine, it will be seen that the conversion may also be obtained with starting brines having a very low $MgCl_2$ concentration: for instance of 5 moles/1000 moles $H_2O$.

The maximum $MgCl_2$ concentration, on the contrary, is determined by the nature of the salts one wishes to obtain in the cold state and to this we shall refer to later.

As far as the processing step in the cold state is concerned, from the diagram it will be seen that at temperatures below 40° C., when the $MgCl_2$ concentration of the brine is between 43 and 52 moles of $MgCl_2$/1000 moles of $H_2O$ the region of metastability is reached for schoenite and KCl for the temperatures from 40° to 20° C. and into the region of stability of leonite and KCl for the temperatures from 25° to 20° C. Furthermore it will be seen that for $MgCl_2$ concentration lower than 43 moles/1000 moles $H_2O$, one can obtain, according to the temperature, metastable schoenite, stable leonite and stable schoenite. However, it is preferred not to work with such $MgCl_2$ concentration, which are already obtainable with known techniques, inasmuch as one of the main objects of this invention is that of obtaining in the final equilibrium brine high $MgCl_2$ concentration and therefore low concentrations of KCl.

If, on the other hand, the $MgCl_2$ concentration lies between 52 and 65 moles of $MgCl_2$, for temperatures between 40° and 20° C. the field of metastability of KCl and $MgSO_4 \cdot 6H_2O$ or $MgSO_4 \cdot 7H_2O$ is attained. It will also be seen that KCl and magnesium sulfate can likewise be obtained with $MgCl_2$ concentrations lower than 52 moles/1000 moles of $H_2O$. Still it is preferred not to work with such contents in $MgCl_2$ in order to obtain a higher yield in potassium. The degree of hydration of the obtained magnesium sulfate depends, as can be seen from the diagram, on the temperature and on the $MgCl_2$ concentration of the brine. The region in which metastable $MgSO_4 \cdot 6H_2O$ is obtained is defined by the lines $E_{34}$–$E_{30}$, $E_{30}$–$F_{25}$ and $F_{25}$–$F_{27}$ while the region in which metastable $MgSO_4 \cdot 7H_2O$ is obtained is defined by the lines $F_{27}$–$F_{25}$, $F_{25}$–$Q_{12}$ and $Q_{12}$–$P_{18}$.

In general it is preferred to obtain $MgSO_4 \cdot 7H_2O$.

It appears quite clear for one skilled in the art that it is possible to obtain in the cold stage a definite mixture of salts, for instance KCl and schoenite starting from brines of various compositions. This mixture may be obtained from a constant quantity of kainite, not only by regulating the concentration of $MgCl_2$ in the starting solution, but also the volume of the latter. A small quantity of brine with a low $MgCl_2$ concentration or larger quantities of various brines having a higher $MgCl_2$ concentration may be used.

In practice, there can be used brines containing from 5 to 40 moles of $MgCl_2$ (per 1000 moles $H_2O$) when KCl and schoenite (or leonite) are desired, and from 10 to 50 moles of $MgCl_2$ (per 1000 moles $H_2O$) when it is desired to obtain KCl and $MgSO_4 \cdot 6H_2O$ or $MgSO_4 \cdot 7H_2O$.

The concentrations of KCl and $MgSO_4$ of the solutions in equilibrium with the solid phases KCl and schoenite (or leonite) or KCl and $MgSO_4 \cdot 6$–$7H_2O$, as a function of the temperature and of the content in $MgCl_2$ can be obtained from the following article of Autenrieth:

"Die stabilen und metastabilen Gleichgewichte des reziproken Salzpaares $K_2Cl_2 + MgSO_4 = K_2SO_4 + MgCl_2$, ohne und mit NaCl als Bodenkoerper, sowie ihre Anwendung in der Praxis," Kali und Steinsalz, Heft 7, 1954: the table of page 8 and following refers to the salt system free from NaCl while the table of page 14 and following refers to the salt system containing NaCl in the solid phase.

If it is desired to obtain, for example, a final mixture containing KCl and schoenite, it can easily be established by calculations readily apparent to one skilled in the art whether the use of a certain quantity of a determined brine may yield KCl as a final solid phase and how much KCl may precipitate.

One must establish: (1) the number of moles of $SO_4^{--}$, $K_2^{++}$ and $Mg^{++}$ for 1000 moles of $H_2O$ in the starting brine and in the final equilibrium brine (for the final brine, these contents are obtained from the aforesaid article of Autenrieth); and the number of moles of kainite to be treated, for instance 100.

One writes the following general equation: 100 kainite ($KCl \cdot MgSO_4 \cdot 2.75H_2O$) + $x$ starting brine having a known content in $SO_4^{--}$, $K_2^{++}$ and $Mg^{++}$) → $y$ schoenite ($K_2SO_4 \cdot MgSO_4 \cdot 6H_2O$) + $zK_2Cl_2$ + $w$ final brine having a known content in $SO_4^{--}$, $K_2^{++}$ and $Mg^{++}$.

In this equation, $x$ per 1000 indicates the number of moles of $H_2O$ of the starting solution, $w$ per 1000 the number of moles of $H_2O$ of the final solution, $y$ the number of moles of schoenite and $z$ the number of moles of $K_2Cl_2$, while the concentrations of $SO_4^{--}$, $K_2^{++}$ and $Mg^{++}$ in the solutions are expressed in moles/1000 moles of $H_2O$.

According to this general equation, one can than write 4 equations relating respectively to the molar balance of the ions $SO_4^{--}$, $K_2^{++}$ and $Mg^{++}$ and of water.

In such a manner, one obtains a linear system of 4 equations with 4 unknowns, the solution of which gives the value of each unknown.

The calculations to be carried out are obviously similar when one wishes to obtain KCl and $MgSO_4 \cdot 6$–$7H_2O$.

When one wishes to obtain KCl and schoenite (or leonite), the concentration of $K_2Cl_2$ of the starting brine must be at least in 2 moles/1000 moles of $H_2O$.

There is practically no maximum limit to be observed as far as the content in KCl of the starting brine is concerned, because it is quite evident that richer the brine in KCl the greater will be the precipitation in KCl in the second phase. One can thus also use brines saturated with $K_2Cl_2$.

When one wishes to obtain KCl and $MgSO_4.6–7H_2O$, it is not necesary that the starting brine contain KCl and $MgSO_4$ since these salts are formed by the decomposition of the kainite.

It is however preferred to use a starting brine having a certain KCl concentration in order to obtain a higher yield in potassium.

When KCl and schoenite or leonite are desired, one preferably uses a brine having a $MgCl_2$ concentration between 10 and 30 moles/1000 moles of $H_2O$ and a $K_2Cl_2$ concentration between 10 and 30 moles/1000 moles of $H_2O$. Such is, for instance, the final brine of a metathesis process between schoenite and potassium chloride for the production of potassium sulfate. This brine usually contains 20–22 moles of $MgCl_2$/1000 moles of $H_2O$ and 25–27 moles of $K_2Cl_2$/1000 moles of $H_2O$. When schoenite is desired, the brine is cooled in the second phase to temperature between 40° and 20° C. When leonite is desired, the brine is cooled to temperature between 25° and 20° C.

When one works at temperatures between 25° and 20° C., it is necessary to operate in the presence of seeds either of schoenite or of leonite depending on which of these salts one wishes to obtain.

When one wishes to obtain KCl and $MgSO_4.6–7H_2O$, use is made preferably of a brine having a $MgCl_2$ concentration comprised between 20 and 50 moles of $MgCl_2$ and from 2 to 20 moles of $K_2Cl_2$/1000 moles of $H_2O$.

Such is, for instance, the final brine of a process for conversion of kainite into schoenite and KCl. This brine usually has a content of 40–50 moles $MgCl_2$ and 7–12 moles $K_2Cl_2$/1000 moles $H_2O$.

When starting with raw or enriched kainite, whether for the production of schoenite or leonite and KCl or for the production of KCl and $MgSO_4.6–7H_2O$, it is possible to introduce in the step of the warm leaching of the kainite, only part of the entire quantity of brine needed for carrying out the two successive steps of warm leaching of the kainite and of cold decomposition of the langbeinite, while the remainder is introduced in the langbeinite decomposition step.

In this case, the first phase uses only the minimum volume of brine necessary for obtaining a complete conversion of the kainite into langbeinite. Usually it is enough to introduce in this phase, for that purpose, from 50 to 70% of the total brine. The conversion of the kainite into langbeinite is not slowed by this technique. By proceeding in this way, one conserves calories in the heating phase and frigoris in the cooling phase, because the volume of the treated brine is smaller.

The saline mixtures are separated from their respective brines by means of known techniques, for instance by centrifugation or filtration. If the need arises, the components of the mixtures are also separated from one another, for instance, by conventional screening, classification or flotation techniques Having, for example, a final mixture of KCl and schoenite, it is possible to separate KCl from the schoenite through floation of the potassium chloride with aliphatic amines. However, it is not necessary to separate the KCl and the schoenite from one another, inasmuch as it is possible to have them react with each other in a successive phase, in the presence of additional KCl, in order to obtain $K_2SO_4$.

If the mixture of KCl and schoenite contains also NaCl, it is possible, for instance, to recover first KCl by flotation with aliphatic amines and thereafter to recover schoenite by flotation with sodium salts of alkylsulfonic acids.

Having a final mixture of KCl and $MgSO_4.6–7H_2O$, it is possible to recover the magnesium sulfate by screening or classification.

If the mixture contains also NaCl, it is possible to separate first $MgSO_4.6–7H_2O$ by screening or classification and then the KCl by flotation.

The passage through the intermediate phase of the langbeinite allows the following advantages to be attained:

(a) The final equilibrium predicted for the kainite or even more favorable equilibria with respect to the potassium yield may be reached within a short time (1–2 hours) inasmuch as at temperatures lower than 40° C. the langbeinite displays a high reaction rate even in brines with $MgCl_2$ concentrations decidedly higher than the brines which are associated with the kainite stability region.

(b) As a result of the high rates of langbeinite decomposition, the predicted equilibria may be reached even when operating with raw kainite ore (NaCl being present as solid phase in the final equilibrium). By comparison, when the conversion reaction is carried out directly on raw kainite ore, the decomposition process is hindered by the NaCl since this dissolves more rapidly than kainite.

(c) Although there is a theoretical possibility of decomposing the kainite to $MgSO_4$ and KCl by reaction with brines at temperatures lower than 17° C. the decomposition is important in industrial practice owing to its slowness. By contrast, according to the present invention, the decomposition may be carried out industrially within very short times (1–2 hours) without the necessity of using temperatures lower than 17° C.

(d) Kainite processing may be directed to the production of only potassium sulfate, or to potassium chloride and sulfate or also to only potassium chloride depending on the market requirements. In fact, when $K_2SO_4$ is desired to be produced from kainite, it will suffice to maintain such a $MgCl_2$ concentration in the langbeinite decomposition brine, in order to obtain schoenite or leonite. For instance, when operating at 25° C., the $MgCl_2$ concentration of the brine will have to be such as not to exceed 49.5 moles/1000 moles water.

Conversely, when KCl production is wanted, it will suffice to carry out the langbeinite decomposition in a brine with such a composition that schoenite or leonite will not be obtained, while, however, KCl and $MgSO_4.6–7H_2O$ will be. For instance if it is operated at 25° C. the $MgCl_2$ concentration of the brine will be made to exceed 49.5 moles/1000 moles of water.

The following examples will point out the further characteristics and advantages of the present invention.

The concentrations specified in each example are calculated according to the conventions used in the above mentioned 6 element saline system, according to which it is assumed that all the $SO_4^{--}$ ions are in the form of $MgSO_4$ and that all the $K^+$ and $Na^+$ ions are all in the form of potassium and sodium chloride respectively, which, for greater convenience, are represented by the formulae $K_2Cl_2$ and $Na_2Cl_2$ (see for instance: Ullman, Encyclopedie der Technischen Chemie, 1957, volume 9, page 197).

PRODUCTION OF KCl AND SCHOENITE

The four first examples concern the kainite processing through the metathesis cycle which is based on the employment of kainite and KCl in order to obtain potassium sulfate. This cycle may be set forth schematically as follows: in a first step the enriched kainite, containing less than 10% NaCl, is reacted at temperatures comprised between 20 and 30° C. with a metathesis brine (obtained in the second step). A mixture of schoenite and KCl is obtained which is separated from the residual brine (schoenite brine) which is discharged or utilized for further processing.

In the second step (metathesis step) the mixture of schoenite and KCl is allowed to react, at temperatures in the range of 20–30° C., with water and potassium chloride. Potassium sulfate and a sulfate brine (metathesis brine) are obtained, the latter being re-utilized in the first step.

In practice the complete conversion of the kainite to schoenite cannot be attained by the known processes, whence the metathesis must be effected in the presence of kainite with a consequent lowering of the $K_2O$ yield of the whole cycle.

The first two examples allow the known above described process to be compared (Example 1) with the process of the present invention (Example 2).

Example 1

105.86 grams of enriched kainite (100 grams of kainite, 5.86 grams of NaCl) obtained by flotation of raw kainite are with 65% kainite and 35% NaCl, having a granulometry comprised between 28 and 250 mesh, are treated with 164.23 grams of metathesis brine originating from a production cycle of potassium sulfate and with a percentage composition by weight of: K 8.21; Mg 3.05; Na 0.30; $SO_4$ 3.93; Cl 13.91; $H_2O$ 70.62, corresponding to a concentration, expressed in moles/1000 moles of $H_2O$, of: $MgSO_4$ 10.43; $MgCl_2$ 21.56; $K_2Cl_2$ 26.79 and $Na_2Cl_2$ 1.66.

After 5 hours of stirring of the resulting slurry, at 25° C., 102.45 grams of solid phase are obtained consisting of: 16.17 grams of KCl, 41.61 grams of schoenite, 44.67 grams of unconverted kainite, 167.64 grams of schoenite mother liquor are formed, having a percentage composition by weight of: K 3.44; Mg 4.77; Na 1.67; Cl 15.94; $SO_4$ 4.97; $H_2O$ 69.21 corresponding to a concentration, expressed in moles/1000 moles of $H_2O$, of $MgSO_4$ 13.47; $MgCl_2$ 37.58; $K_2Cl_2$ 11.45; $Na_2Cl_2$ 9.45.

$$\text{Kainite conversion} = \frac{\text{converted kainite}}{\text{introduced kainite}} = 55.33\%$$

Potassium yield of the process:

$$\frac{K_{KCl} + K_{schoenite}}{K_{intr.\ kainite} - K_{unconv.\ kainite} + K_{metath.\ brine}} = 74.16\%$$

By contrast, when operating with the intermediate formation of langbeinite at 110° C., according to the process of the present invention, the results reported in Example 2 are obtained.

Example 2

105.86 grams of enriched kainite (100 grams of kainite, 5.86 grams of NaCl) obtained by flotation of raw kainite ore with 65% kainite and 35% NaCl, with granulometry comprised between 28 and 250 mesh, are treated with 164.23 grams of metathesis brine originating from a potassium-sulfate production cycle and of a percentage composition by weight of K 8.21; Mg 3.05; Na 0.03; Cl 13.91; $SO_4$ 3.93; $H_2O$ 70.62 coresponding to a concentration, expressed in moles/1000 of water, of $MgSO_4$ 10.43; $MgCl_2$ 21.56; $K_2Cl_2$ 26.79 and $Na_2Cl_2$ 1.66, at 110° C. during 30 minutes. The obtained langbeinite slurry is cooled at 25° C. and conditioned at this temperature for 60 minutes; 93.15 grams of solid phase are obtained, consisting of: 21.57 grams of KCl, 71.58 grams of schoenite, and, 176.94 grams of schoenite brine are formed, having a percentage composition by weight of: K 2.4; Mg 6.01; Na 1.58; Cl 17.31; $SO_4$ 6.56; $H_2O$ 66.13 corresponding to a concentration, expressed in moles/1000 moles of $H_2O$, of: $MgSO_4$ 18.60; $MgCl_2$ 48.75; $K_2Cl_2$ 8.36; $Na_2Cl_2$ 9.36.

Kainite conversion: 100%.
Potassium yield of the process:

$$\frac{K_{KCl} + K_{schoenite}}{K_{introd.\ kainite} + K_{metath.\ brine}} = 85.53\%$$

The new process permits the following advantages to be obtained:

(a) An increase of potassium yield of the processing from 74.16% to 85.53%;

(b) The complete conversion of the kainite to schoenite, which results in a higher yield in the metathesis step;

(c) The decrease of conversion time from 5 to 1 hour thanks to the rapid conversion of langbeinite to schoenite and KCl at 25° C.

When the conversion of kainite to schoenite is carried out directly on raw kainite without proceeding to the preliminary operation of enrichment through flotation in order to remove the rock salt, then the reaction of kainite conversion according to the known process proves to be further slowed as is evidenced from the data reported in Example 3.

Example 3

153.85 grams of raw kainite ore (100 grams of kainite, 53.85 grams of NaCl) with granulometry in the range between 28 and 250 mesh are treated with 164.23 grams of metathesis brine with the percentage composition by weight of: K 8.21; Mg 3.05; Na 0.30; $SO_4$ 3.93; Cl 13.91; $H_2O$ 70.62, corresponding to a concentration expressed in moles/1000 of water of: $MgSO_4$ 10.43; $MgCl_2$ 21.56; $K_2Cl_2$ 26.79; and $Na_2Cl_2$ 1.66.

After 5 hours stirring at 25° C., 145.29 grams of a solid phase are obtained, consisting of: 16.34 grams of KCl, 30.64 grams of schoenite, 56.16 grams of kainite, 42.15 grams of NaCl, and 172.80 grams of schoenite brine are formed, having a percentage composition by weight of: K 3.46; Mg 4.35; Na 2.45; Cl 16.50; $SO_4$ 5.25; $H_2O$ 67.99, corresponding to a concentration, expressed in moles/1000 moles of $H_2O$ of: $MgSO_4$ 14.59; $MgCl_2$ 33.16; $K_2Cl_2$ 11.81; $Na_2Cl_2$ 14.22.

Kainite conversion: 43.84%.
Potassium yield of the process:

$$\frac{K_{KCl} + K_{schoenite}}{K_{introd.\ kain.} - K_{unconv.\ kain.} + K_{metath.\ brine}} = 70.87\%$$

By contrast, when operating through the intermediate formation of langbeinite, the results reported in Example 4 are obtained.

Example 4

153.85 grams of raw kainite ore (100 grams of kainite, 53.85 grams of NaCl) with granulometry in the range between 28 and 250 mesh are treated with 164.23 grams of metathesis brine with percentage composition by weight of: K 8.21; Mg 3.05; Na 0.30; $SO_4$ 3.93; Cl 13.91; $H_2O$ 70.62, corresponding to a concentration, expressed in moles/1000 moles of water, of: $MgSO_4$ 10.43; $MgCl_2$ 21.56; $K_2Cl_2$ 26.79; and $Na_2Cl_2$ 1.66, at 110° C. during 30 minutes.

The resulting langbeinite slurry is cooled at 25° C. and conditioned at this temperature for 60 minutes: 141.09 grams of solid phase are obtained, consisting of: 21.34 grams of KCl, 71.76 grams of schoenite, 47.99 grams of NaCl, and 177.03 grams of schoenite brine are formed, having a percentage composition by weight of: K 2.41; Mg 6.01; Na 1.58; $SO_4$ 6.56; Cl 17.31; $H_2O$ 66.13, corresponding to a concentration expressed in moles/1000 moles of $H_2O$, of: $MgSO_4$ 18.60; $MgCl_2$ 48.75; $K_2Cl_2$ 8.36; $Na_2Cl_2$ 9.36.

Kainite conversion: 100%.
Potassium yield of the process:

$$\frac{K_{KCl} + K_{schoenite}}{K_{introd.\ kainite} + K_{metath.\ brine}} = 85.28\%$$

As will be noted, when employing the process of the present invention, the yields obtained with raw kainite (Example 4) are like the ones obtained with enriched kainite (Example 2). Thus, according to the process of the present invention, there will be no need to process enriched kainite in order to obtain good yields.

PRODUCTION OF KCl AND MgSO$_4$.7H$_2$O

Example 5

153.85 grams of raw kainite with granulometry comprised between 28 and 250 mesh are treated at 110° C. with 296.32 grams of a schoenite mother liquor having a percentage composition by weight of: K 2.41; Mg 6.01; Na 1.58; SO$_4$ 6.56; Cl 17.31; H$_2$O 66.13, coresponding to a concentration, expressed in moles/1000 moles of H$_2$O, of: MgSO$_4$ 18.60; MgCl$_2$ 48.75; K$_2$Cl$_2$ 8.36; Na$_2$Cl$_2$ 9.36, during 30 minutes.

The obtained langbeinite slurry is cooled at 25° C. and conditioned at this temperature for 120 minutes. 217.46 grams of solid phase are obtained, consisting of: 36.11 grams of KCl, 60.74 grams of NaCl, 120.61 grams of MgSO$_4$.7H$_2$O, and 232.71 grams of mother liquor are formed, having a percentage composition by weight of: SO$_4$ 5.03; Cl 19.10; Mg 6.81; K 1.80; Na 0.85; H$_2$O 66.41, corresponding to a concentraiton, expressed in moles/1000 moles of H$_2$O, of: MgSO$_4$ 14.20; MgCl$_2$ 61.70; K$_2$Cl$_2$ 6.24; Na$_2$Cl$_2$ 5.01.

We claim:

1. A process for producing potassium chloride and schoenite as desired products, comprising the steps of:
   (I) treating kainite with a brine containing magnesium chloride and potassium chloride at a temperature between substantially 90° C. and 115° C. to produce a langbeinite slurry;
   (II) cooling said slurry to a temperature between substantially 40° C. and 20° C. to precipitate the desired products from a final brine in equilibrium therewith, and adding schoenite seeds to the final brine for precipitation of schoenite when the precipitation is carried out at a temperature of 25° to 20° C.; and
   (III) establishing the concentration of magnesium chloride in the final brine in equilibrium with the recovered salts at 43 to 52 moles per 1000 moles H$_2$O and saturation by potassium chloride, by using an initial brine containing 5 to 40 moles of magnesium chloride and at least 2 moles K$_2$Cl$_2$ per 1000 moles H$_2$O.

2. The process defined in claim 1 wherein the initial brine has an MgCl$_2$ concentration between 10 and 30 moles and a K$_2$Cl$_2$ concentration comprised between 10 and 30 moles per 1000 moles of H$_2$O.

3. The process defined in claim 2 wherein the initial brine is the final brine of a metathesis process between schoenite and potassium chloride for the production of potassium sulfate.

4. The process defined in claim 1 wherein the kainite ore is raw kainite; sodium chloride is present in the obtained potassium chloride and schoenite; and the final equilibrium brine is saturated with sodium chloride.

5. The process defined in claim 1 wherein only a portion of the quantity of the total brine requirement for the process in steps (I) and (II) is introduced in step (I) for the treatment of the kainite and the balance of the brine requirement is introduced directly into step (II).

6. A process for producing as desired products potassium chloride and magnesium sulfate containing 6 to 7 molecules of water per molecule of magnesium sulfate, comprising the steps of:
   (I) treating kainite with a brine containing magnesium chloride at a temperature between substantially 90° C. and 115° C. to produce a langbeinite slurry;
   (II) cooling said slurry to a temperature between substantially 40° C. and 20° C. to precipitate the desired products from a final brine in equilibrium therewith; and
   (III) establishing the concentration of magnesium chloride in the final brine in equilibrium with the recovered salts at 52 to 65 moles per 1000 moles H$_2$O and saturation by potassium chloride and magnesium sulfate, by using an initial brine containing 10 to 50 moles of magnesium chloride per 1000 moles H$_2$O.

7. The process defined in claim 6 wherein the initial brine has an MgCl$_2$ concentration between 20 and 50 and a K$_2$Cl$_2$ concentration between 2 and 20 moles/1000 moles of H$_2$O.

8. The process defined in claim 6 wherein the kainite ore is raw kainite; sodium chloride is present in the potassium chloride and magnesium sulfate obtained; and the final equilibrium brine is saturated with sodium chloride.

9. The process defined in claim 6 wherein only a portion of the quantity of the total brine requirement for the process in steps (I) and (II) is introduced in step (I) for the treatment of kainite and the balance of the brine requirement is introduced directly in step (II).

10. A process for producing potassium chloride and leonite as desired products, comprising the steps of:
    (I) treating kainite with a brine containing magnesium chloride and potassium chloride at a temperature between substantially 90° C. and 115° C. to produce a langbeinite slurry;
    (II) cooling said slurry to a temperature between substantially 25° C. and 20° C. in the presence of seeds of leonite to precipitate the desired products from a final brine in equilibrium therewith; and
    (III) establishing the concentration of magnesium chloride in the final brine in equilibrium with the recovered salts 43 to 52 moles per 1000 moles H$_2$O and saturation by potassium chloride by using an initial brine containing 5 to 40 moles of magnesium chloride and at least 2 moles K$_2$Cl$_2$ per 1000 moles H$_2$O.

11. The process defined in claim 10 wherein the initial brine has an MgCl$_2$ concentration between 10 and 30 moles and a K$_2$Cl$_2$ concentration between 10 and 30 moles per 1000 moles of H$_2$O.

12. The process defined in claim 10 wherein the kainite ore is raw kainite; sodium chloride is present in the potassium chloride and leonite obtained; and the final equilibrium brine is saturated with sodium chloride.

13. The process defined in claim 10 wherein only a portion of the quantity of the total brine requirement for the process in steps (I) and (II) is introduced in step (I) for the treatment of kainite and the balance of the brine requirement is introduced in step (II).

References Cited

UNITED STATES PATENTS

| | | | |
|---|---|---|---|
| Re. 24,890 | 10/1960 | Burke | 23—128 |
| 1,815,735 | 7/1931 | Heath | 23—304 X |
| 2,479,001 | 8/1949 | Burke et al. | 23—89 X |
| 2,702,121 | 2/1955 | Colin et al. | |
| 2,902,344 | 9/1959 | Cevidalli et al. | 23—128 X |
| 2,881,050 | 4/1959 | Autenrieth | 23—128 X |
| 3,003,849 | 10/1961 | Veronica | 23—38 |
| 3,058,806 | 10/1962 | Ebner | 23—121 |
| 3,199,948 | 10/1965 | Scarfi et al. | 23—38 |
| 3,207,576 | 9/1965 | Marullo et al. | 23—38 X |
| 3,243,259 | 3/1966 | Stein et al. | 23—38 X |
| 3,415,620 | 12/1968 | Scarfi et al. | 23—121 |

OTHER REFERENCES

Autenrieth B., Kali und Steinsalz, Heft II, October 1955, pp. 27 and 28.

OSCAR R. VERTIZ, Primary Examiner

G. T. OZAKI, Assistant Examiner

U.S. Cl. X.R.

23—42, 89, 117, 128, 302, 304, 121